United States Patent [19]

Shono

[11] Patent Number: 4,536,070
[45] Date of Patent: Aug. 20, 1985

[54] DEVICE FOR ADJUSTING THE FOCUSING DETECTING MECHANISM OF A SINGLE-LENS REFLEX CAMERA

[75] Inventor: Tetsuji Shono, Tokyo, Japan

[73] Assignee: Asahi Kogaku Kogyo Kabushiki Kaisha, Tokyo, Japan

[21] Appl. No.: 573,457

[22] Filed: Jan. 24, 1984

[30] Foreign Application Priority Data

Jan. 24, 1983 [JP] Japan .................. 58-8053[U]

[51] Int. Cl.³ ........................................... G03B 3/00
[52] U.S. Cl. ............................... 354/402; 354/479; 354/152
[58] Field of Search ............ 354/400, 402, 406, 410, 354/476, 479, 152, 153, 154, 155, 156, 201, 220, 224, 225

[56] References Cited

U.S. PATENT DOCUMENTS

| | | | |
|---|---|---|---|
| 3,540,365 | 11/1970 | Ishizaka | 354/154 |
| 4,103,311 | 7/1978 | Horigome | 354/152 |
| 4,320,945 | 3/1982 | Kimura | 354/479 |
| 4,342,508 | 8/1982 | Haraguchi | 354/152 |

Primary Examiner—Russell E. Adams
Attorney, Agent, or Firm—Sughrue, Mion, Zinn, Macpeak and Seas

[57] ABSTRACT

A device for adjusting a focusing detecting mechanism in a single-lens reflex camera includes a first mirror holding frame having a first mirror of the half reflecting type adapted to divide a light beam from a lens into a reflected light beam and a transmitted light beam, and being rotatably mounted on a mirror box body. A second mirror holding frame having a second mirror adapted to reflect the transmitted light beam from said first mirror is rotatably mounted on said first mirror holding frame through at least one shaft. The shafts for mounting the second mirror holding frame is movable in a direction which is substantially parallel with the surface of said first mirror. A focusing detecting device is provided at a position which is on the optical axis of said light beam reflected by said second mirror and is in conjugation with a finder focusing screen.

3 Claims, 1 Drawing Figure

U.S. Patent    Aug. 20, 1985    4,536,070
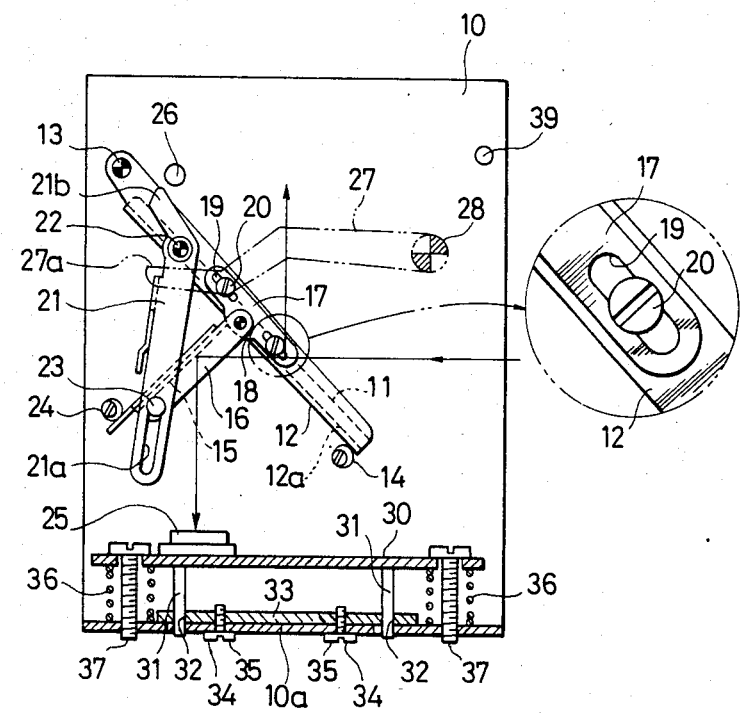

DEVICE FOR ADJUSTING THE FOCUSING DETECTING MECHANISM OF A SINGLE-LENS REFLEX CAMERA

BACKGROUND OF THE INVENTION

This invention relates to a focusing detecting mechanism in a single-lens reflex camera in which a light beam passing through a first mirror, of the half reflective type, is reflected by a second mirror and then applied to a focusing detecting device. More particularly, the invention is directed to an improvement in the invention described in U.S. Pat. No. 4,342,508 or Japanese Utility Model application No. 128629/1980 (Japanese Utility Model application Laid-Open No. 51940/1982) by the present applicant.

In the aforementioned application, a first mirror holding frame is rotatably supported by a mirror box body, and a second mirror holding frame having a second mirror is rotatably mounted on the first mirror holding frame. When in an observation position a light beam reflected by the second mirror is applied to a focusing detecting device. When in a photographing position, a second mirror operating lever lifts the second mirror holding frame in association with the rise of the first mirror holding frame. It is essential that the focusing detecting device be set at the position which is in conjugation with the focusing screen of the finder and the surface of the film, and for the light beam to be perpendicular to the focusing detecting device. In the aforementioned application, the angle of opening of the second mirror holding frame can be adjusted by an angle adjusting pin. However, with this pin as the only adjusting means, it is sometimes impossible to make the incident light beam perpendicular to the focusing detecting device because of errors in components dimensions, or the like. The focusing detecting range of the focusing detecting device is displayed on the finder's focusing screen, for instance, as a central horizontal line on a split image type focusing screen, or as a U-shaped pattern or an inverted-U-shaped pattern. However, if the focusing detecting device is not movable, and there are dimensional errors in the components, the focusing detecting range displayed on the focusing screen does not coincide with the actual focusing range, and as a result the lens is not accurately focused on the aimed object.

SUMMARY OF THE INVENTION

An object of this invention is to eliminate this newly-found difficulty. A specific feature of the invention is the provision of at least one rotating shaft provided for pivotally mounting the second mirror frame carrying the second mirror on the first mirror holding frame, the shaft being movable in a direction which is substantially parallel with the surface of the first mirror. The position of the focusing detecting device is adjustable in the direction of the optical axis of a light beam reflected by the second mirror, so that the correct focusing range is displayed on the focusing screen of the finder.

BRIEF DESCRIPTION OF THE DRAWINGS

The single FIGURE in the accompanying drawing is a side view showing the essential components of one example of a device for adjusting a focusing detecting device in a single lens reflex camera according to the teachings of the invention.

DETAILED DESCRIPTION OF THE PREFERRED EMBODIMENTS

This invention will now be described with reference to its preferred embodiments. In the single FIGURE of the accompanying drawing reference numeral 10 designates a mirror box body; and 11, a first mirror, namely, a half reflecting mirror which is secured to a first mirror holding frame 12. Shafts 13 embedded in the upper portions of both sides of the first mirror holding frame 12 are supported by the mirror box body 10, and the first mirror holding frame 12 is urged clockwise in the FIGURE by a first mirror restoring spring (not shown). The swing of the first mirror holding frame 12 is limited by a first mirror angle adjusting pin 14, so that frame 12 is held at an observation position. A second mirror 15 is a total reflection mirror secured to a second mirror holding frame 16. The first mirror holding frame 12 has a light passing window 12a so as to pass transmitted light to the second mirror 15.

The upper end portions of both sides of the second mirror holding frame 16 are pivotally mounted on shafts 18 which are embedded in supporting plates 17 secured to the two sides of the first mirror holding frame 12. Each supporting plate 17 has elongated holes 19 and 19 which are extended in parallel with the surface of the first mirror 11. The supporting plates 17 are secured to both sides of the first mirror holding frame 12 with screws 20 inserted into the elongated holes 19. Accordingly, the position of the shafts 18 can be adjusted in parallel with the surface of the first mirror 11 by means of the elongated holes 19 and the fixing screws 20. This is one of the specific features of this invention.

With further reference to the FIGURE, reference numeral 21 designates a second mirror operating lever which is pivotally mounted on shafts 22 which are embedded in the two sides of the first mirror holding frame 12. The lever 21 is urged clockwise in the FIGURE by a second mirror restoring spring (not shown). A pin 23 embedded in one side of the second mirror holding frame 16 is engaged with an elongated hole 21a cut in the second mirror operating lever 21. Therefore, the torque of the lever 21 is transmitted through the pin 23 to the second mirror holding frame 16. The swing of the lever 21 is limited as the second mirror holding frame 16 abuts against a second mirror angle adjusting pin 24. All the members are so positioned that, under this condition, the light beam passing through the lens is passed through the first mirror 11 and reflected by the second mirror 15, and then applied to a focusing detecting device 25.

The second mirror operating lever 21 has a protruded portion 21b which extends above the shaft 22. When the first mirror 11 jumps up, the protruded portion 21b strikes a roller on the mirror box body 10 to turn the second mirror operating lever 21 counterclockwise. A mirror up lever 27 (indicated by the two-dot chain line) is turned about a shaft 28 on the mirror box body 10 clockwise in the FIGURE by a mirror driving member (not shown) when the shutter is released. As a result, the end portion 27a of the lever 27 is engaged with the above-described shaft 22 to lift the first mirror holding frame 12.

Another specific feature of the invention resides in a mechanism for adjusting the position of the above-described focusing detecting device 25. The device 25 is fixedly secured to a base plate 30. Guide pins 31 are embedded in the base plate 30 in such a manner as to extend downwardly. An adjusting plate 33 is secured to the bottom plate 10a of the mirror box body 10 with screws 34. The adjusting plate 33 has guide holes 32 with which the guide pins 31 are slidably engaged. The bottom plate 10a has inserting holes 35 into which the screws 34 are inserted. The inserting holes 35 are large enough to adjust the position of the adjusting plate 33 in a direction perpendicular to the axial direction of the guide pins 31. The base plate 30 is urged upwardly by compression springs 36 and is held by position adjusting screws 37 against the elastic force of the compression springs 36. Two guide pins 31, two compression springs 36 and two position adjusting screws 37 are shown in the FIGURE. However, in practice, three guide pins, three compression springs and three position adjusting screws are provided in a manner to define a plane.

When the first mirror 11 and the second mirror 15 are at their observation positions as shown in the FIGURE, the light beam reflected by the first mirror 11 reaches the focusing plate in the finder, while the light beam which passes through the first mirror 11 and has been reflected by the second mirror 15 is applied to the focusing detecting device 25. When the shutter is released, the mirror up lever 27 is turned clockwise, while the first mirror holding frame 12, the second mirror holding frame 16 and the second mirror operating lever 21 are turned counterclockwise, so that the first mirror holding frame 12 is held substantially horizontal by a stopper 39. Accordingly, the light beam is applied to the film, while no light is applied to the finder. The position (or angle) of the second mirror 15 can be adjusted by changing the position of the second mirror angle adjusting pin 24. When the optical axis of the light beam reflected from the second mirror cannot be included in a plane parallel with the surface of the accompanying drawing, the supporting plates 17 should be moved in the longitudinal direction of the first mirror 11 with the screws unscrewed. Accordingly, the second mirror 15 held by the shafts 18 on the supporting plates 17 is moved in the same direction. Thus, the optical axis of the light beam reflected by the second mirror 15 can be included in the plane parallel with the surface of the drawing with minimum movement. That is, adjustment has been so made that the light beam reflected from the second mirror is exactly perpendicular to the focusing detecting device.

The position of the focusing detecting device 25 in the direction of the optical axis of the reflected light beam can be changed by screwing or unscrewing the position adjusting screws 37. Therefore, the focusing detecting range of the focusing detecting device 25 can be made to accurately coincide with the focusing detecting range which is displayed on the focusing screen of the finder. In the adjustment, the focusing detecting device 25 can be moved in the direction of the optical axis of the reflected light beam with the guide pins 31 being guided by the guide holes 32, and the position of the focusing detecting device 25 in a direction perpendicular to the optical axis of the reflected light beam can be adjusted by moving the adjusting plate 33 with the screws 34 loosened.

The shafts 18 for the second mirror 16 are embedded in both sides of the first mirror holding frame 12. However, the object of the invention may be achieved by providing only one supporting plate adapted to adjust the position of the shaft 18.

As is apparent from the above description, according to the invention, the rotary shafts for the second mirror holding frame are movable in a direction parallel with the surface of the first mirror. Therefore, the direction of the optical axis of the light beam reflected by the second mirror can be readily corrected, and the reflected light beam can be made perpendicular to the focusing detecting device. Accordingly, the focusing detecting accuracy of the focusing detecting device can be improved. In addition, as the focusing detecting device is movable in the direction of the optical axis of the reflected light beam, the correct focusing range is displayed on the focusing screen in the finder. The provision of the above-described position adjusting mechanism permits relatively wide ranges of tolerances for the dimensions of the components. This is another effect or merit of the invention.

I claim:

1. A device for adjusting a focusing detecting mechanism in a single-lens reflex camera which comprises: a first mirror holding frame having a first mirror of the half reflecting type adapted to divide a light beam from a lens into a reflected light beam and a transmitted light beam, and being rotatably mounted on a mirror box body; a second mirror holding frame having a second mirror adapted to reflect the transmitted light beam from said first mirror, and being rotatably mounted on said first mirror holding frame through at least one shaft; and a focusing detecting device provided at a position which is on the optical axis of said light beam reflected by said second mirror and is in conjugation with a finder focusing screen; wherein said at least one shaft for mounting said second mirror holding frame is movable in a direction which is substantially parallel with the surface of said first mirror.

2. A device as claimed in claim 1, wherein said focusing detecting device is movable in the direction of the optical axis of said light beam reflected by said second mirror.

3. A device as claimed in claim 2, wherein said focusing detecting device is fixedly secured to a base plate, and further including guide pins embedded in the lower surface of said base plate in such a manner that said guide pins are extended in a direction parallel with the optical axis of said light beam reflected by said second mirror, said guide pins being slidably engaged with guide holes cut in an adjusting plate, the position of which is adjustable in a direction perpendicular to said optical axis.

* * * * *